United States Patent [19]

Howell

[11] 4,076,336
[45] Feb. 28, 1978

[54] HYDROSTATIC BEARINGS WITH CONTROLLED LUBRICANT PRESSURE

[76] Inventor: Roy M. Howell, 115 Meadbrook Road, Garden City, N.Y. 11530

[21] Appl. No.: 654,468

[22] Filed: Feb. 2, 1976

Related U.S. Application Data

[63] Continuation-in-part of Ser. No. 528,342, Nov. 29, 1974, Pat. No. 3,943,895.

[51] Int. Cl.² .............................................. F16C 29/00
[52] U.S. Cl. .................................. 308/3.5; 308/4 R; 308/5 R; 308/9
[58] Field of Search ............... 308/9, 15, 184, 21, 308/187, 78, 187.1, DIG. 1, 4 R, 5 R, 5 V, 3 R, 3.5; 92/168

[56] References Cited

U.S. PATENT DOCUMENTS

| | | | |
|---|---|---|---|
| 3,223,463 | 12/1965 | Porath | 308/9 |
| 3,231,046 | 1/1966 | Ohrnberger | 308/9 X |
| 3,938,862 | 2/1976 | Schurger et al. | 308/9 |
| 3,964,805 | 6/1976 | Schulien | 308/9 X |

Primary Examiner—Trygve M. Blix
Assistant Examiner—Douglas C. Butler
Attorney, Agent, or Firm—Eisenman, Allsopp & Strack

[57] ABSTRACT

The required pumping power for hydrostatic bearings is reduced with bearings having at least two lubricating areas bounded with a narrow raised perimeter of lower clearance. The lubricant is supplied under pressure and is retained with an area which is large enough to provide a low friction thick film of lubricant while the clearance at the narrow, raised perimeter is small enough to provide satisfactory control of lubricant loss rates. In particular embodiments, the raised perimeter is provided by sealing assembly mounted on one side of the sliding surfaces.

5 Claims, 7 Drawing Figures

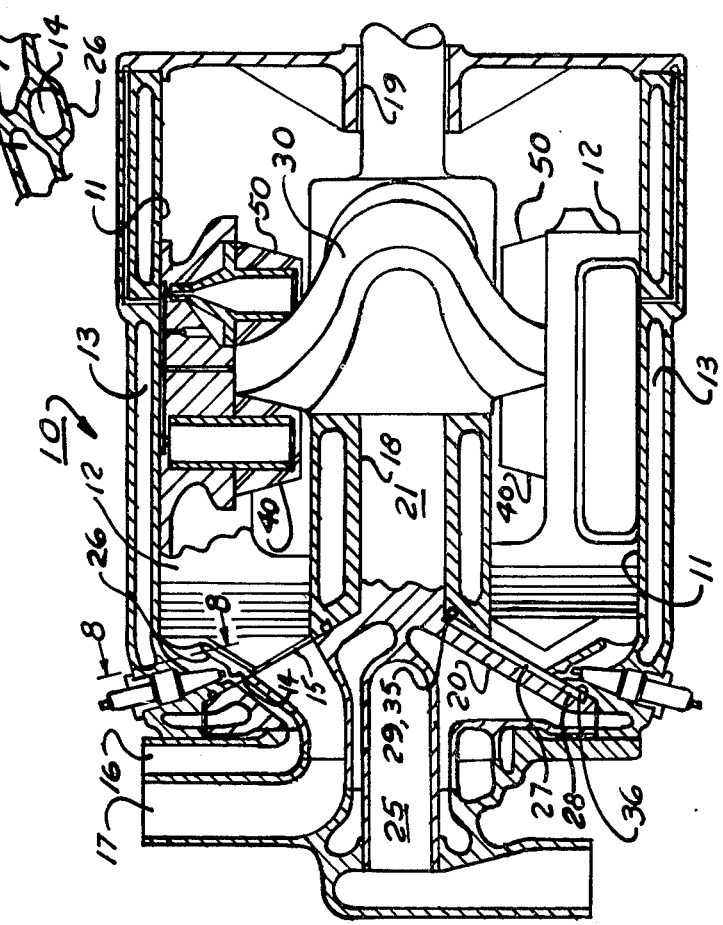
FIGURE 8
FIGURE 1
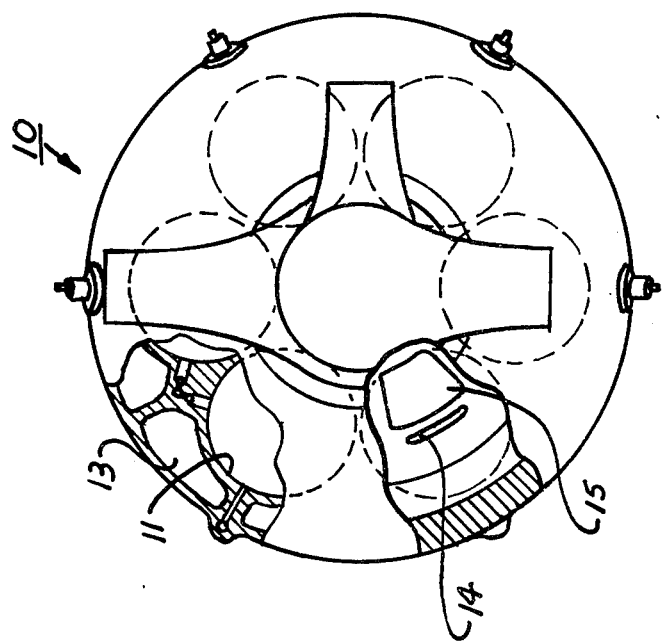
FIGURE 2

HYDROSTATIC BEARINGS WITH CONTROLLED LUBRICANT PRESSURE

RELATED APPLICATIONS

This is a continuation-in-part of co-pending patent application Ser. No. 528,342, filed Nov. 29, 1974, now U.S. Pat. No. 3,943,895.

BACKGROUND OF THE INVENTION

1. Field of the Invention

The invention relates to sliding surfaces and more particularly, it relates to the hydrostatic lubrication of sliding surface bearings.

2. Description of the Prior Art

The invention is described within the environment of axial cylinder internal combustion engines. Of course, while the preferred embodiment has been described in this manner, the use of the invention for sliding surface bearings within a multitude of other embodiments, is to be expected. It is common practice when applying fluid lubricants to some sliding surface bearings, to pump lubricant between the surfaces at pressures exceeding the pressure created by the load on the sliding elements. The bearings using this type of pressurized lubricant are called "hydrostatic" bearings. In such bearings, the high pressure lubricant supply maintains a relatively thick film of lubricant between the sliding surfaces and very low coefficients of friction result. However, the total power loss with such bearings must include the power required to pump the lubricant. Since this pumping-power loss can be three or four times greater than the frictional power loss that is being overcome, the resultant efficiency of this type of bearing is significantly reduced.

Many styles of axial cylinder internal combustion engines have been developed wherein the cylinders are parallel to, and equi-distant from, the main engine shaft. Such machines have been known in the past as barrel engines or simply round engines, because their distinguishing characteristic is the circular or cylindrical arrangement of the elements. Frequently, these engines are designed for conventional four cycle operation. A cylindrical cam couples the pistons to the drive shaft. Where ridge cams are used, cam followers on each piston track the radial surfaces of the rotating cam.

These engines contain inherent advantages of low cost, light weight, and small volume. Nevertheless, they have not been commercially successful. In axial cylinder engines, sharp load reversals are experienced by the reciprocating pistons, and such load reversals, particularly where accompanied by excessive clearance requirements, result in hammering contact at mating surfaces, noisy operation, and short life. To a large extent, the past deficiencies of these engines can be traced to the relatively large variations in the clearances among the mating parts due to manufacturing tolerances, thermal distortions and wear.

SUMMARY OF THE INVENTION

It has been discovered that by restricting the flow of the high pressure lubricant from between load bearing surfaces to only that required for maintaining acceptable temperatures, a worthwhile reduction in overall power loss is achieved. The present invention provides means for reducing pumping power losses by reducing the quantity of lubricant flowing out from between lubricated surfaces in the load bearing areas.

The particular means of accomplishing the invention can be tailored to suit the requirements of particular applications. In those cases where the load on the bearing is substantially constant and uni-directional it is sufficient to provide a recess in the bearing surface, in the load bearing area, and bound this recess with a narrow raised perimeter of lower clearance. The bearing clearance in the recess is large enough to provide a low friction thick lubricant film while the clearance at the narrow, ridge-like raised perimeter is small enough to provide satisfactory control of lubricant loss rates. In applications where the load is not constant and uni-directional, a separate sealing element may be incorporated into one of the sliding surfaces. In still other cases, where the loads are cyclical in nature, a check valve may be incorporated between the lubricant source and the seal-bounded area of the bearing.

An object of the present invention is to provide an improved sliding surface bearing.

Another object of the invention is to provide improved hydrostatic bearings containing recessed lubricant bearing areas.

Another object of the invention is to provide an improved sliding surface bearing wherein lubricant is provided under pressure and the pumping power is minimized by structures incorporated in the sliding surfaces.

Still another object of the invention is to introduce check valve means in combination with uniquely structured hydrostatic bearings.

In accordance with one aspect of the invention, there is provided hydrostatic bearings having means for restricting the rate of lubricant flow from between the load bearing areas of the sliding surfaces. Lubricant is fed to these load bearing areas under pressure and retained therein by a raised portion surrounding the area; the lubricant being maintained at a sufficient pressure to effect at least a predetermined flow of lubricant from said area at all times. In particular instances, the raised portion may take the form of flexible seals mounted within one of the sliding surfaces.

The enumerated objects and features of the invention as well as additional unique aspects of a particular illustrative embodiment will be more fully understood and appreciated from the following description which is made in conjunction with the attached drawings.

BRIEF DESCRIPTION OF THE DRAWINGS

FIG. 1 is a schematic representation of a longitudinal section taken through an axial cylinder internal combustion engine embodying the present invention;

FIG. 2 is a front end view of the engine illustrated in FIG. 1 with cut-away portions revealing the dual intake ports and the check valves supplying oil to the pistons;

FIG. 8 is a partial cross-section through the cylinder head taken along the lines 8—8 of FIG. 1, showing the pocket which isolates the rich fuel mixture within the main combustion chamber.

DESCRIPTION OF THE PREFERRED EMBODIMENT

Figure 3:
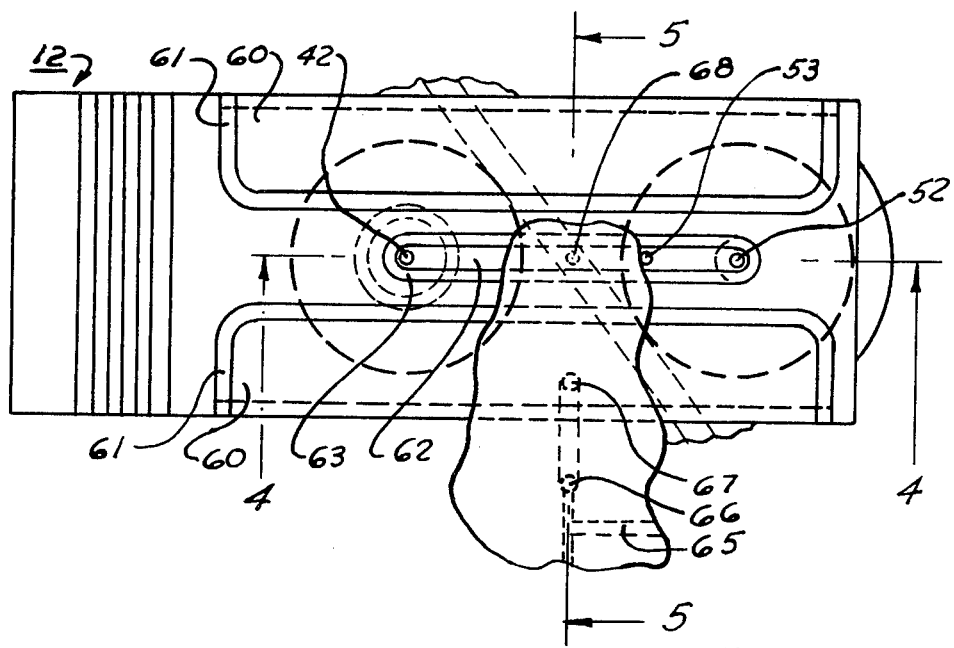
FIG. 3 is an enlarged view of a typical piston employed in an engine embodying the invention, wherein a portion of the cylinder block is illustrated to show the arrangement of the oil entrapment and transfer compartment seals.

The axial cylinder engine 10 of FIGS. 1 and 2, has a plurality of cylinders 11 disposed about its periphery. Each cylinder contains a reciprocating piston 12. The engine block is provided with cooling channels 13, through which cooling fluid may be circulated in the known manner. The head of each cylinder is divided into sections to maintain fuel-mixture separation until after ignition. Thus, FIGS. 1 and 8 show the rich fuel-mixture cylinder port 14 and FIG. 1 shows lean fuel-mixture cylinder port 15. These passages are completed to the fuel-mixture intake system via input ports 16 and 17 respectively.

The shaft 21 of the rotating valve assembly 20 is mounted along the axis of the engine in bearings 18 and 19. Cylindrical cam 30 is secured to shaft 21 and imparts rotation thereto, so that the valve assembly and reciprocating piston movement are coordinated to effect four cycle operation. Cam rollers 40, 50, associated with each piston, couple the piston movement to the tapered side walls 31, 32 of the cam 30.

Figure 4:
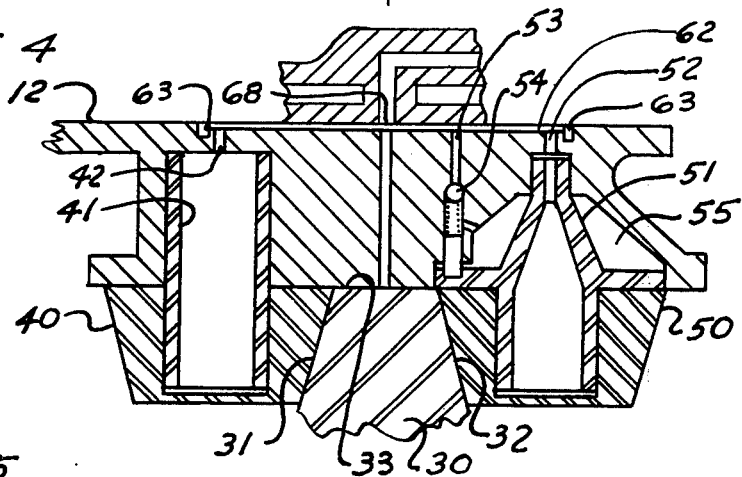
FIG. 4 is an enlarged cross-section taken along the lines of 4—4 of FIG. 3 showing the cam follower portions of a piston, the adjacent cylinder wall, and the cylindrical cam.
Figure 5:
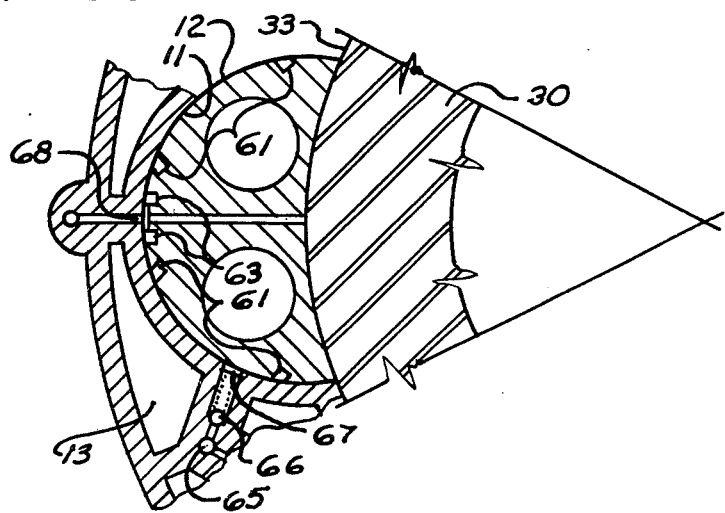
FIG. 5 is an enlarged cross-section taken along the lines 5—5 of FIG. 3 showing the ports and check valves for entrapment of lubricant between the cylinder walls and piston.

It is conventional in engines of this type to utilize tapered roller cam followers attached to the pistons and engaging conforming sloped faces of a nominally sinusoidal cam ridge which is configured to accommodate the four piston strokes required for a four cycle engine. The illustrated engine employs unique hydraulically driven roller followers 40, 50 as shown in FIGS. 1 and 4. Each follower is coupled to its piston, as shown in FIG. 4, by pins 41 and 51. Each piston 12 bears against the outside diameter or circumferential face 33 of cam 30. The skirts of the pistons 12 are configured to the contour of the cam ridge 33 as illustrated in FIG. 5.

Piston 12 slides axially in its cylinder 11. As shown in FIGS. 1, 3, and 5 each piston 12 is provided with continuous flexible sealing elements 61 in bearing contact with the adjacent cylinder wall 11. These sealing elements are secured within suitable grooves in the piston skirt. The cylinder block contains oil pressure galleries 65 which supply oil under pressure through check valves 66 to oil transfer holes 67 in each cylinder wall. Holes 67 are positioned to remain in registry with the piston skirt area bounded by the sealing element 61 throughout the entire piston travel.

The illustrated arrangement is typical for applications where the bearing loads are substantially uni-directional and cyclical in nature. In such installations, lubricant is pumped at relatively low pressure, through the check valve 66 into the space formed by the sliding surfaces and the seal to form a low-friction thick oil film. This thick lubricant film is maintained during pressures of high bearing loads by the combined entrapment action of the seal and the check valve. Where the bearing loads are uni-directional and substantially constant, i.e. non-cyclical, the check valve may be omitted and the sealing means alone should be sufficient.

In accordance with the illustrated embodiment of the invention, each piston 12 is provided with oil entrapment areas 60 which are formed by mounting continuous flexible sealing elements 61 in bearing contact against the adjacent cylinder wall. These sealing elements are affixed within suitable grooves in the piston skirt. In addition, each piston is provided with an oil pressure transfer area 62 which is similarly formed by mounting a continuous cylinder-wall-contacting flexible sealing element 63 within a groove in the piston skirt. These elements and their position are shown from various aspects in FIGS. 3, 4, and 5.

The cylinder block contains oil pressure galleries 65 which supply oil under pressure through check valves 66 to oil transfer holes 67 in each cylinder wall. Holes 67 are positioned to remain in registry with the oil entrapment areas 60 throughout the entire piston travel. Similarly, the cylinder block contains oil pressure galleries terminating in oil pressure holes 68 (FIG. 5) positioned in the cylinder wall to continuously register through the piston travel with the oil pressure transfer area 62.

Within each piston, oil passages 42 and 52 lead from the pressure transfer area 62 to the hollow follower pins 41, 51. Thus, oil from the main oil distribution system is supplied under pressure to the roller cam followers 40, 50. Each piston is also provided with an oil passage 53 fitted with a check valve 54 to feed oil irreversibly from area 62 to a chamber 55 in which the follower pin 51 is axially slidable.

It is known that in reciprocating piston engines of this type, both gas pressure and inertia loads on the pistons pass from peak value to substantially zero at least once during each operating cycle of four strokes. With the roller followers 40, 50 and the sloping faces 31, 32 of cam 30 configured for minimum sliding contact as shown, these load produce components which tend to drive the pistons and their followers radially away from the cam. However, the oil pressure maintained at the oil transfer hole 68 causes oil to flow through the check valve 54 into the chamber 55 to force the follower pin 51 and its connected follower roller 50 radially inward into contact with the mating surface 32 of cam 30 whenever the outward load component on the follower is relatively low. When the outward load component on the follower 50 rises above the oil-pressure-created inward force, retreat of the follower from its position of contact with the cam is prevented by the oil in chamber 55 and the uni-directional nature of check valve 54. Thus, follower 50 is maintained in direct contact with the face of cam 30 throughout an entire load range.

The structure and hydraulic linkage of this invention is designed to maintain oil at suitable pressure by conventional pump means so that the oil flows from the oil gallery 65 in the block through check valve 66 into oil entrapment areas 60 in each piston 12 when the radially outward piston load component is relatively low. This oil under pressure is trapped within the space between the piston 12, the cylinder wall 11, and the sealing element 61, and effectively forces the piston 12 radially inward to assure firm contact with the outer surface 33 of cam 30 and to assure a thick oil film on the skirt. When the outward radial component of the piston load rises above the inward radial component produced by oil pressure in the oil entrapment areas 60, oil is prevented from flowing out of the entrapment areas by the uni-directional characteristic of check valve 67. The trapped oil prevents any substantial movement of the piston away from the cam 30 and provides low-friction, thick-film lubrication. Direct contact between the piston 12 and the cam is thus maintained over the operating range of the engine and compensates for any manufacturing tolerances or thermal distortion that may be created during operation.

It should be understood that sufficient leakage is provided in both the oil entrapment areas 60 and the cam follower chambers 55 to accommodate the reduction in piston, follower and cam clearances, caused by temperature increases.

In a typical operating cycle a "rich" fuel-mixture is supplied to annular input passage 16 and a lean fuel-mixture is supplied to annular input passage 17. Rotary valve assembly 20 successively connects the input passages to each cylinder, during the intake stroke. The fuel-mixture is then compressed and a spark is applied at the proper time to ignite the rich mixture. Details of timing and ignition are well known in the art and need not be explained herein. The burning rich mixture ignites the lean mixture to develop the combustion stroke, driving piston 12 to the right. On the return stroke, valve assembly 20 vents the cylinder via the single central exhaust passage 25.

Fuel stratification is effected by configuring the rich fuel-mixture input section at the head of each cylinder to keep the small amount of rich fuel-mixture substantially separated from the lean fuel-mixture until after ignition. Port 14 is much smaller and is effectively obstructed from the cylinder interior by partition 26.

Figure 7:
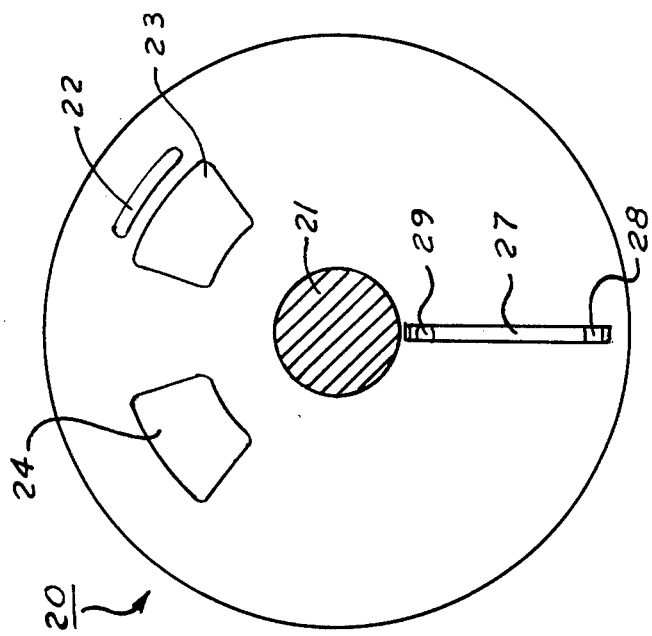
FIG. 7 is a view of the rubbing surface of the rotary valve shown in FIG. 6.
Figure 6:
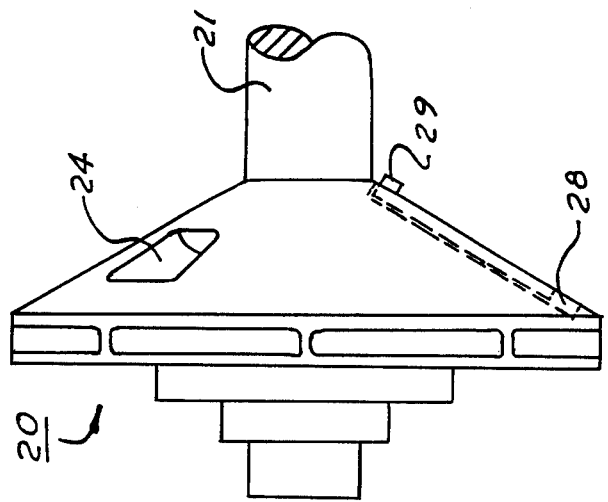
FIG. 6 is a side view of the rotary valve and shaft of an engine embodying the invention.

The functioning of valve assembly 20 will be better appreciated by examination of FIGS. 6 and 7. Valve port 22 is dimensioned to interconnect the rich fuel-mixture annular passage 16 to cylinder port 14 and valve port 23 is dimensioned to interconnect the lean fuel-mixture annular input passage 17 to cylinder port 15. The valve assembly rotates counter-clockwise, as viewed in FIG. 7, and thus valve exhaust port 24 interconnects the cylinder head to the exhaust passage 25 at the end of each operating cycle.

The important function of lubricating the valve surface is accomplished with an oil spreader bar 27 mounted in a radial slot 28 on the face of the valve plate. Bar 27 has a projection 29 at one end, adapted to project into a mating sinusoidal groove 35 in the face of the engine block. Oil is supplied under pressure to slot 28 via a passage 36. Thus, as the valve assembly rotates, the sinusoidal groove 35 causes radial reciprocation of bar 27 and oil is continuously spread across the mating surfaces of the valve assembly and block. Bar 27 may ride freely within slot 28, or it may be pressed into contact with the opposed engine block face by a flat spring or similar biasing element. Clearly, the length of bar 27 and the amplitude of sinusoidal groove 35, determine the surface area swept by the lubrication bar.

A particular embodiment of the invention has been shown and described. In several instances, references were made to modifications that would occur to those skilled in the art. Such modifications as well as numerous others, will be apparent. All modifications which come within the spirit and teachings of this disclosure, are intended to be covered by the following claims.

What I claim is:

1. A hydrostatic bearing comprising, first and second proximate surfaces adapted for relative movement, a liquid lubricant between said surfaces, and raised means on at least one of said surfaces peripherally defining at least two independent enclosed areas within which said lubricant is substantially confined, a pressurized source of lubricant, means for introducing said lubricant into said enclosed area, and check valve means between said pressurized source and said enclosed area, said liquid lubricant being subjected to sufficient pressure to effect a predetermined minimum flow of lubricant from each said enclosed area at all times, said raised means restricting the rate of flow of the lubricant from within said enclosed area, whereby a major portion of the bearing load is borne by a thick film of said lubricant.

2. A hydrostatic bearing as defined in claim 1 wherein said raised means comprises flexible sealing means mounted within at least one of said surfaces.

3. A hydrostatic bearing as defined in claim 2 including a pressurized source of lubricant and means for introducing said lubricant into said enclosed area.

4. A hydrostatic bearing as defined in claim 3 wherein said raised means restricts the rate of flow of the lubricant from within said enclosed area.

5. A hydrostatic bearing as defined in claim 3 including check valve means between said pressurized source and said enclosed area.

* * * * *